FIG. 1

INVENTORS
Jack M. Buss
Joseph A. Suddreth
BY
ATTORNEY

July 4, 1967  J. M. BUSS ETAL  3,329,181
APPARATUS AND METHOD FOR CUTTING ASSORTED LENGTHS FROM
MATERIAL HAVING IRREGULAR AND RANDOM DEFECTS
Filed Jan. 8, 1965  6 Sheets-Sheet 2

FIG. 2

INVENTORS
Jack M. Buss
Joseph A. Suddreth
BY
Clifton T. Hunt Jr.
ATTORNEY

INVENTORS
Jack M. Buss
Joseph A. Suddreth
BY
Clifton T. Hunt Jr.
ATTORNEY

INVENTORS
Jack M. Buss
Joseph A. Suddreth
BY
ATTORNEY

July 4, 1967 J. M. BUSS ETAL 3,329,181
APPARATUS AND METHOD FOR CUTTING ASSORTED LENGTHS FROM
MATERIAL HAVING IRREGULAR AND RANDOM DEFECTS
Filed Jan. 8, 1965 6 Sheets-Sheet 6

INVENTORS
Jack M. Buss
Joseph A. Suddreth
BY
ATTORNEY

United States Patent Office 3,329,181
Patented July 4, 1967

3,329,181
APPARATUS AND METHOD FOR CUTTING ASSORTED LENGTHS FROM MATERIAL HAVING IRREGULAR AND RANDOM DEFECTS
Jack M. Buss and Joseph A. Suddreth, Lenoir, N.C., assignors to Broyhill Furniture Factories, Lenoir, N.C., a partnership
Filed Jan. 8, 1965, Ser. No. 424,364
25 Claims. (Cl. 143—47)

ABSTRACT OF THE DISCLOSURE

This invention involves the art of woodworking, and more particularly is directed to an apparatus and method for cutting random sizes of lumber into pieces of stock having a predetermined size with a minimum amount of waste.

---

The present invention is generally concerned with the art of cutting and particularly with the employment of computer technology in the cutting of materials having irregular and unpredictable defects or flaws such as experienced in the cutting of wooden boards, plate glass, sheet metal and the like.

In various woodworking industries such as the furniture industry it is necessary to provide many different sizes of wood pieces. For example, a furniture factor which makes household furniture in large quantities requires a continuous supply of different size wood pieces for its production lines. Both core stock and dimension stock pieces are required in large quantities. The term "core stock" refers to boards of selected lengths and varying widths which are glued together and collectively define the inner ply or core of laminates. The term "dimension stock" means boards cut to exact relatively large sizes free from objectionable defects for use in subsequent manufacture. Core stock is, of course, more readily obtainable than dimension stock because it may contain defects which would be intolerable in dimension stock and because of its size.

These various size pieces must in turn be obtained from boards which come to the furniture factory as rough cut and rough dressed boards. Of particular interest to the present invention is the fact that the rough boards are generally not square at either end and are inherently possessed with various defects of different sizes and character such as tight and loose knots, cracks, checks, splits, warped sections, bark and the like. It is generally necessary to cut out as waste those portions of the board which contain defects as well as whatever portions are required to square off the ends. At the same time it is obviously desirable to minimize waste.

With the foregoing in mind, it becomes evident that a decision must be made with respect to each board as to how it should be cut in order to gain maximum use of the wood in the board, take the least number of cuts, produce the least amount of waste and meet the factory's production requirements. It also becomes necessary to keep account of how many pieces of a particular size have been cut in order to avoid cutting too many or too few pieces of a particular size. Consideration must also be given to the fact that long and wide pieces are less easily obtained than short and narrow pieces since a particular defect is less apt to interfere with obtaining a short length or a narrow width piece than it is with obtaining a long length or wide width piece. Priority must therefore be given to the larger sizes required until sufficient quantities of these are obtained after which the priority can be shifted down to the next larger size and so forth. In some instances consideration must be given to the character of the defect. For example, furniture pieces which are hidden from view can sometimes utilize wood having a tight or sound knot. It can be seen then that each board calls for a separate decision as to how the board should be cut and a changing set of factors affect the decision from board to board.

While applicable to the cutting of material forms other than wooden boards and to lengthwise as well as transverse or lateral cutting, the invention is explained in connection with the initial cross-cut operation found in furniture factories who use rough cut, rough dressed, wooden boards as a basic starting material and from which different quantities and sizes of smaller wooden pieces are obtained.

In the initial cross-cut operation, as conventionally performed, the boards are brought in individually on a conveyor or other handling device to a cross-cut saw station. The saw operator directs the saw across the board and cuts it into smaller pieces of the same or different lengths according to what is required. The operator makes the cutting decisions in accordance with general instructions furnished him and according to the location of the defects in each board as it comes to the saw. Considering the fact that board defects are irregular and unpredictable and will vary widely in number per board, in character, in size and in location on the board and the further fact that vast quantities of boards are subjected to an initial cross-cut operation in furniture manufacturing plants, it will be readily seen that there is much room for human operator error when the operator is forced to continuously calculate the most efficient way to crosscut each individual board, cut each board to various length pieces and spend a minimum amount of time per board in line with large-scale production requirements. Also, much clerical and handling labor is required to sort and count what has been cut in order to maintain some degree of control over what lengths should be cut and in what priority.

In the present invention as applied to the example of cross-cut sawing in a furniture factory operation, a computer is programmed to make the determination of where cross-cuts should be made in each board. In determining the location of cross-cuts, the computer is programmed to take into consideration the fact that each board will be sawed longitudinally into required widths. While not necessarily directly concerned with the ripping operation, the computer may permit certain undesirable defects to pass the cross-cut saw with the knowledge they will be eliminated at the rip saw. In its programming, the computer is informed as to (1) the lengths and widths of dimension stock needed for volume production of one or more given items of furniture, for example, a dresser; (2) the size of pieces that may utilize tight knots; (3) the numbers of each size required and the degree of priority to be assigned to each size; (4) the requirements of core stock; and (5) the width of scrap cuts.

The computer is then fed information, in electrical form, on each successive board carried past a scanning station as to the dimensions of the board, the location of each defect in the board with respect to fixed references, the size of each defect and, where applicable, whether or not the defect constitutes a tight knot. The computer utilizes this information in accordance with its programmed requirements and makes determinations as to where successive boards should be cut. The determinations are relayed to the cross-cut saw station and the board is cut accordingly.

Information is retained by the computer as to what lengths have been selected and the quantities of each such length in order that the priorities assigned various sizes may be constantly revised as requirements of the varying sizes are met.

While not directed to computers, per se, or to a computer program, per se, the invention is directed to the employment of a computer as an element in an apparatus combination taught by the invention and to employment of a computing step in a method taught by the invention. While the present invention indicates use of the computer control signals to provide information for cutting successive boards, it is to be understood that the control of the board during the cutting operation may be accomplished either manually or mechanically within the spirit of this invention. The present invention is thus directed to the scanning apparatus and method associated with the board prior to the board reaching the cross-cut station and is further directed to the apparatus and method associated with utilizing at a saw station the computer translated board defect information.

A primary and general object of the invention is to utilize computer technology in the cutting of material with irregular defects into pieces of predetermined size.

Another object is to provide an apparatus and method which lend themselves to use of a computer for the purpose of determining where to cut a piece of material having irregular defects so as to divide it into predetermined sizes with a minimum of waste.

Another object is to provide for the woodworking industry an apparatus and method which enables board defect information to be fed to and analyzed by a computer such that the boards can be cut into predetermined quantities of predetermined sizes with a minimum of waste.

Another specific object is to provide suitable scanning apparatus for converting to computer signals the location, the size and in some instances the character of defects present in a material having various irregular defects.

Another object is to provide a method for furniture factories and the like wherein determinations for cutting boards for maximum utilization of the wood can be made prior to the board reaching the saw station.

The foregoing and other objects of the invention will appear from the description to follow, and in the drawings in which—

In the manufacture of wooden furniture in connection with which an embodiment of the invention is described, the rough boards as received from saw mills or other sources are stacked in hacks and are usually kiln dried and transported from the kiln area to the room or area of the factory where the boards are to be cut into the various sizes required. The cutting operations require both cross-cut and rip saws in order to get the lengths and widths desired from the boards and in order to remove all undesirable defects. However, each board is first cut with a cross-cut saw and the lengths obtained are later directed to sanding machines, dressing machines, rip saws and the like until the finished sizes are obtained, some of which are used for dimension stock and some of which are used for core stock. Because of the substantial amount of waste that normally accrues at the initial cross-cut saw station the invention has been applied to such a cross-cut operation. The description to follow is therefore concerned principally with furnishing information for this cross-cut operation.

According to the invention, the boards are conveyed by means of an operator controlled conveyor to a first station which will be termed the "scanning station." At the scanning station there is located apparatus to be described as a "scanner," readout units which translate the varying character of the scanner output into a form which may be understood and utilized by a computer, a device to be described as a "rotary pulse generator" and photoelectric controls.

The scanning station apparatus broadly comprises means to obtain electrical data from which may be ascertained location coordinates of randomly positioned defects in a board carried by a conveyor relative to the leading end and an edge of the board, which electrical data is in a form which may be understood and utilized by a suitably programmed computer. Since the defect location coordinates are to be used by a computer to select a pattern of transverse cuts perpendicular to the plane of the board, location coordinates for the defects need only be found in two dimensions, length and width. By application of the principles of trigonometry, it is well known that given the length of a line extending from an end point having fixed coordinates relative to the zero point of a rectangular coordinate system to an end point of a second line and given the length of the second line extending to a variable point, the coordinates of the variable point relative to the zero point of said rectangular coordinate system may be found by measuring the angle between the first line and an axis of the coordinate system, by measuring the angle between the first line and the second line, and by applying the appropriate trigonometric relationships thereto.

Figure 2:
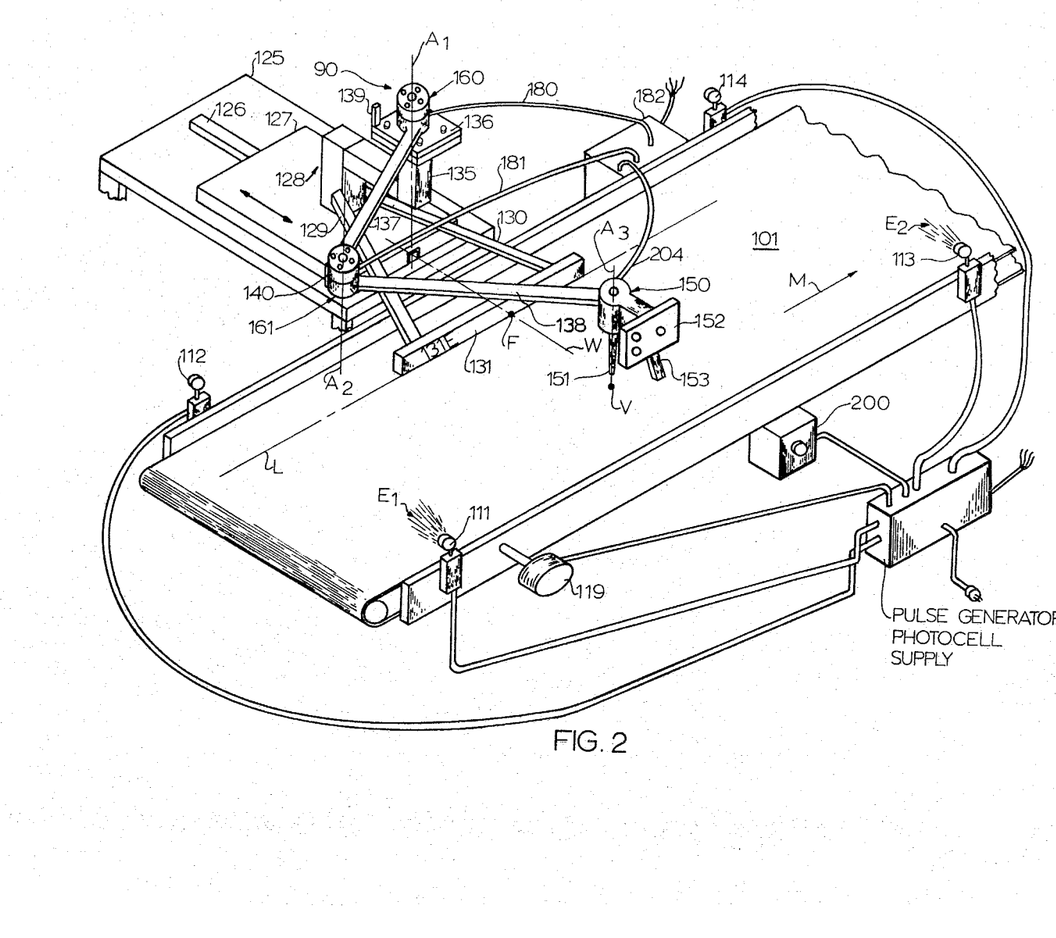
FIGURE 2 is a partial perspective of the scanner portion of the system and showing how the scanner can be moved inwardly.

Referring to FIGURE 2, the scanner 90 utilizes the above stated postulate to facilitate the location of randomly positioned defects in a board carried by a conveyor with respect to the leading end and an edge of the said board. In the present embodiment, the scanner 90 is positioned adjacent the side of a conveyor 101 and is mounted on a table 125 having a guide 126. A platform 127 engages the guide 126 and is mounted such that it can be manually moved by an operator back and forth perpendicular to the path of movement M of the conveyor 101. A fabricated offset post structure 128 is integrally secured to platform 127. A pair of stringer members 129, 130 are fixed to structure 128 and overhang conveyor 101. A reference bar 131 is so fixed to the ends of members 129 and 130 as to be disposed over the conveyor 101 and parallel to the path of movement M of the conveyor 101.

Structure 128 includes a vertical post 135 upon which is fixed a plate member 136 which in turn pivotally supports an articulated arm structure that includes arm members 137 and 138. Arm 137 is pivotally secured at one end to plate 136 for rotatable movement about an axis A which is perpendicular to the plane of the conveyor 101. Arm 138 is movable with and pivotally secured at one end to the extended end of arm 137 for rotatable movement about an axis A which is also perpendicular to the plane of the conveyor 101. The disposition of permissible directions of rotation of arm 137 relative to plate 136 and of rotation of arm 138 relative to arm 137 may be but need not be inverted for a scanner to be used with a conveyor moving in the opposite direction.

A control assembly 150 is pivotally connected to the extended end of arm 138 for rotatable movement about an axis $A_3$ which extends through the arm 138 perpendicularly to the plane of the conveyor 101. A pointed rod, vertically adjustable to accommodate various thicknesses of boards and designated as a probe 151, extends along axis $A_3$ from the control assembly 150 toward the conveyor 101 positioned therebeneath. The control assembly 150 includes a handle 153 and a scanner control 152 shown in FIGURE 5 as having push buttons 201, 202, and 203 and an output lead 204. From the foregoing description, it may be seen that the handle 153 may be grasped by an operator and used to maneuver the arm structure, much like the arms of a drafting machine are maneuvered, so that the axis $A_3$ which extends along the probe 151 may be brought into registry with any variable point V (FIGURE 2) in the conveyor 101 within the reach of the arms 137 and 138.

Figure 3:
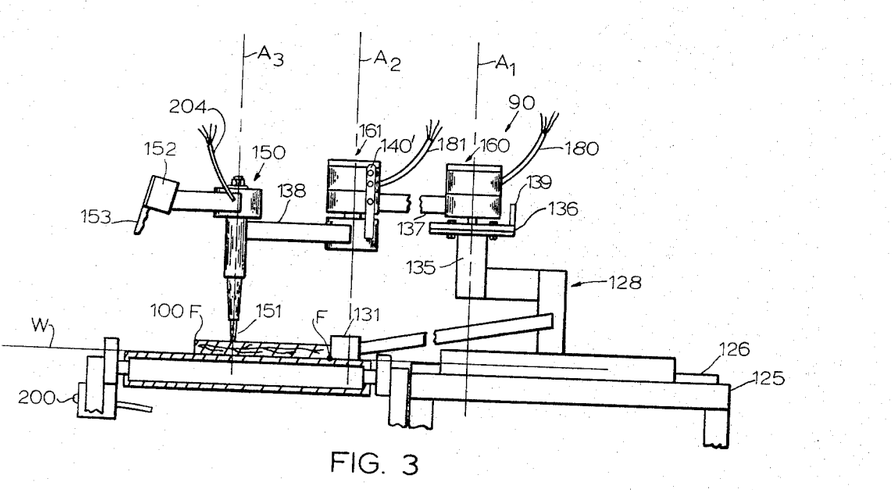
FIGURE 3 is a partial side elevation of the scanner portion showing the scanner probe positioned over a board.
Figure 4:
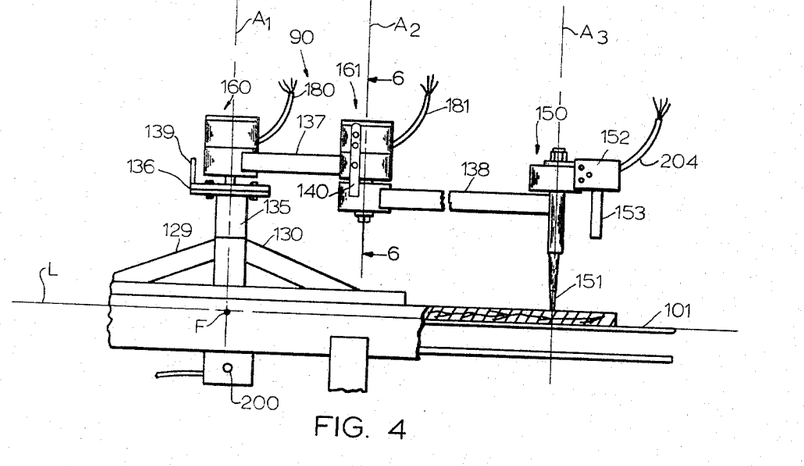
FIGURE 4 is a partial front elevation of the scanner portion.

Since the variable points to be located are points associated with randomly positioned defects in a board carried by the conveyor 101, the arms 137 and 138 need actually only be rotatable about their respective axes for 180 degrees relative to the respective calibration lines $C_1$ or $C_2$ in order that the probe 151 be brought into registry with all registrable variable points along said conveyor within the reach of the arms. Therefore, a stop bar 139 which extends perpendicularly upward from a rear corner of the plate member 136 prevents rotation of the arm 137 beyond the calibration line $C_1$ as shown in dotted lines in FIGURE 9. Calibration line $C_1$ bears a known angular disposition relative to an imaginary length axis L extending along the reference bar 131. A stop bar 140 which extends downwardly from encoder 161 near axis $A_2$ prevents rotation of the arm 138 beyond the calibration line $C_2$ (FIGURE 9) which extends along arm 138 from axis $A_2$. An auxiliary stop bar 140' (FIGURE 3) may depend from the side of encoder 161 opposite bar 140 to limit inward movement of arm 138.

Referring again particularly to FIGURE 2, an imaginary width axis W extends perpendicularly from axis $A_1$ across the conveyor 101 perpendicular to the path of movement M of the conveyor. The aforesaid imaginary length axis L extends along the intersection of the projected face 12TE of reference bar 131 and the conveyor 101 and is thereby parallel to the path of movement M of the conveyor 101. The intersection of the axis W with the axis L is designated as the fixed point F, see FIGURE 2, and is the origin for the rectangular coordinate system defined by axes W and L. Whereas the distance between the fixed point F and the intersection of axis W with axis $A_1$ is known, and the distance between the axis $A_2$ and the axis $A_3$ is known, the location of any variable point V beneath the probe 151 relative to the fixed point F may be determined in terms of rectangular coordinate units of the coordinate system defined by axes W and L by measuring the respective angles between the axis W and the arm 137 and between the arm 137 and the arm 138, and by applying the appropriate trigonometric relationships thereto.

Those skilled in the art will recognize that various electro-mechanical means or encoder means may be satisfactorily used to measure the aforesaid angles. For example, rheostats and potentiometers may be adapted for this purpose. In the preferred embodiment of the invention digital shaft encoders generally designated at 160 and 161, are positioned respectively at the pivotal interconnection of arm 137 with the plate member 136 and at the pivotal interconnection of arm 138 with arm 137. Each encoder means has adjustable electrical elements connected to and movable with the arms 137, 138 so that each has a varying electrical character and is further operable to give an electrical indication which varies in a predetermined way with the amount of rotation of the respective arm 137, 138. Various digital shaft encoders are commercially available, and an encoder made by Perkin-Elmer Corporation of Norwalk, Conn. and designated their model 1-1024 has been found satisfactory in actual practice.

Digital shaft encoders of this type are well known and generally consist of adjustable electrical elements including a multilayer printed circuit disc and a radially extending rotatable wiper assembly. The disc contains a number of concentric insulated conducting rings each having a pattern of gold plating disposed along the top thereof. Each ring has an output conductor electrically connected therewith. When a direct current voltage is applied to the wiper which is moved relative to the disc, the gold plating facilitates conduction from the wiper to the respective ring, and, thereby, the electrical character is varied for the output conductors are energized in a predetermined sequence in accordance with whether or not a given ring has a gold plated segment disposed beneath the wiper when the wiper is moved from one radial position to another.

Figures 5, 6:
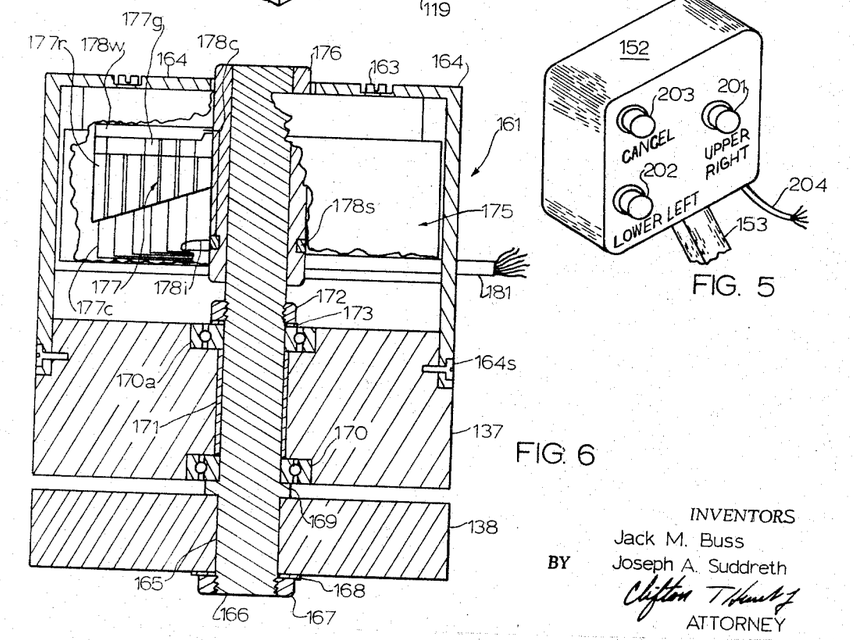
FIGURE 5 is a perspective of the readout control panel.
FIGURE 6 is a cross-sectional elevation view taken along line 6—6 of FIGURE 4.

FIGURE 6 shows a somewhat schematic illustration of the digital shaft encoder 161 as positioned to measure the amount of rotation of arm 138 relative to arm 137, the thickness of the gold plating being greatly exaggerated. Encoder 160 is constructed in a similar manner, and a description of encoder 161 will suffice for an understanding of both encoders. A shaft 166 having a projecting ring 169 extends downwardly through a bore 165 which extends through the end of arm 138 along axis $A_2$. A lock-nut 167 and washer 168 are affixed to the threaded end of shaft 166 so that the arm 138 is clamped between the ring 169 and the lock-nut 167 and washer 168. Thereby, when the arm 138 is rotated about axis $A_2$, shaft 166 is also rotated about axis $A_2$. Shaft 166 passes through the ball bearings 170, 170a, and the sleeve bearing 171 in arm 137. A lock-nut 1722 and washer 173 assist in holding the arm assembly whereby arm 137 carries the shaft 166 which in turn carries the arm 138. Shaft 166 is rotatable within the sleeve bearing 171 of arm 137 so that arm 138 may be rotated about axis $A_2$ relative to arm 137. The shaft of encoder 160 is similarly supported by the plate 136 so that the arm 137 and the respective disc and wiper assembly may be rotated relative to the plate 136, shaft and wiper about axis $A_1$.

The encoder 161 includes a housing 164 about an axial hollow shaft 176 extending through a disc and wiper assembly 175 which includes a printed circuit disc 177. The shaft 176 is rotatable relative to the printed circuit disc 177 and is adapted to tightly receive the shaft 166 so that rotation of the shaft 166 carries with it the hollow shaft 176. The disc and wiper assembly 175 is suspended from the top wall of housing 164 as by screws 163. The housing 164 is in turn secured to arm 137 by screws 164s.

The shaft 176 carries a radially extending conducting wiper 178w and also carries a slip ring 178s. A conductor 178c electrically connects the wiper 178w with the slip ring 178s. An input conductor 178i electrically connects the slip ring 178s and, thereby, the wiper 178w with a voltage supply associated with the encoder readout unit 182, more fully described below.

The disc 177 comprises a concentric series of ten (six of which are shown in exaggerated section in FIGURE 6) insulated conducting rings 177r, each ring being electrically connected with a respective output conductor 177c. Each ring 177r has disposed about its top a pattern of arcuate gold plating segments 177g. The segments 177g facilitate the electrical connection of the wiper 178w with the conducting rings 177r and, thereby, with the output conductors 177c. The pattern of gold plating segments 177g disposed along the tops of the rings 177r is such that for each one-third degree of rotation of the wiper 178w relative to the disc 177, the wiper 178w encounters a unique disposition of rings 177r having arcuate gold plating segments 177g thereon. Therefore, when the wiper 178w has a voltage impressed thereon and is radially disposed in this position, the output conductors 177c associated with the rings 177r which have gold plating segments 177g thereon will transmit an electrical current from the wiper 178w, and the output conductors 177c associated with the rings 177r which have no segments 177g will not transmit a current from the wiper 178w.

Thus, as the arm 138 is rotated relative to arm 137, the amount of rotation can be electrically measured for the combination of conductors 177c which are transmitting or conducting a current from the wiper 178w is unique for each one-third degree wide position of the wiper 178w relative to the disc 177. As the arm 137 is rotated relative to plate 136, the amount of that rotation can be similarly electrically measured. The output lines 180 and 181 of the respective encoder units 160 and 161 carry the respective wiper input conductor 178i and the output conductors 177c of encoders 160 and 161 to their respective readout units 182, there being a readout unit for each of said encoders, schematically shown at 182. The readout units 182 translate the respective combination of conducting output conductors 177c into respective binary signals each arrayed upon a group of nine angular dispositions data output bits, which signal is fed into the computer 120.

The readouts units 182 may be of the type designated Model 4R Encoder Readout Units and made by the same Perkin-Elmer Corporation of Norwalk, Conn. Since the encoders are to be used to measure amounts of rotation of up to 180 degrees, the tenth output bit of each said Model 4R Encoder Readout unit is not used. Each unit 182 supplies a voltage to the respective input conductor 178i carried by the respective output line 180 and 181 to its respective digital shaft encoder units 160 and 161. Each unit 182 also supplies to each of its output bits either no voltage or a voltage of minus six volts D-C. The respective given arrays of bits having a voltage impressed thereupon corresponds to a respective particular combination of output conductors 177c which are conducting and become different for each one-third degree of rotation of the respective wiper relative to its disc.

Since the digital computer 120 used with the invention herein disclosed is actuated by input voltage pulses having a magnitude of minus 48 volts D-C, it is necessary to change the minus six volts D-C impressed upon each given output bit to a corresponding minus 48 volts D-C. This is accomplished in a manner well known in the art by feeding out output of each readout unit into a relay bank wherein the minus six volts impressed upon a given output bit energizes a corresponding relay which closes a corresponding normally open switch between an input from a minus 48 D-C voltage power supply and the appropriate angular disposition data output bit of the relay bank. Conductors electrically connect each angular disposition data output bit with a corresponding input into the computer 120. Thereby, the computer 120 has two groups of inputs, each of which group comprises a combination of angular disposition data output bits which are either impressed with a minus 48 D-C voltage or have no voltage impressed thereupon. Each combination corresponds to a respective particular angular disposition of the arm 137 with the plate 136 or the arm 138 with the arm 137.

Figure 9:
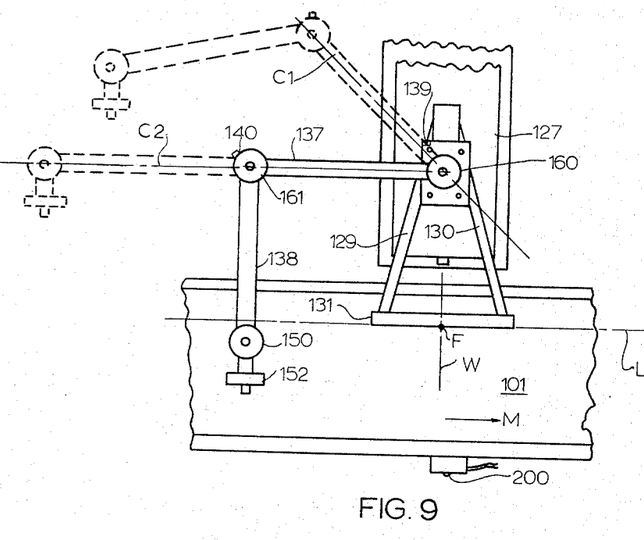
FIGURE 9 is a partial plan view of the scanner and the conveyor.

The arms 137 and 138 are shown in calibration position in FIGURE 9. It has been found to be necessary to periodically check the disposition of the encoders 175 with the readings indicated by the encoder readout unit 182. To this end the arms 137 and 138 are rotated to known positions and readings taken. If the then existing readings from the encoder readout unit 182 are not the proper readings, calibration may be effected by adjusting the computer program or the relative positions of the appropriate wiper assembly 178w and the respective printed circuit disc 177 may be adjusted until the proper readings are obtained.

Figure 8:
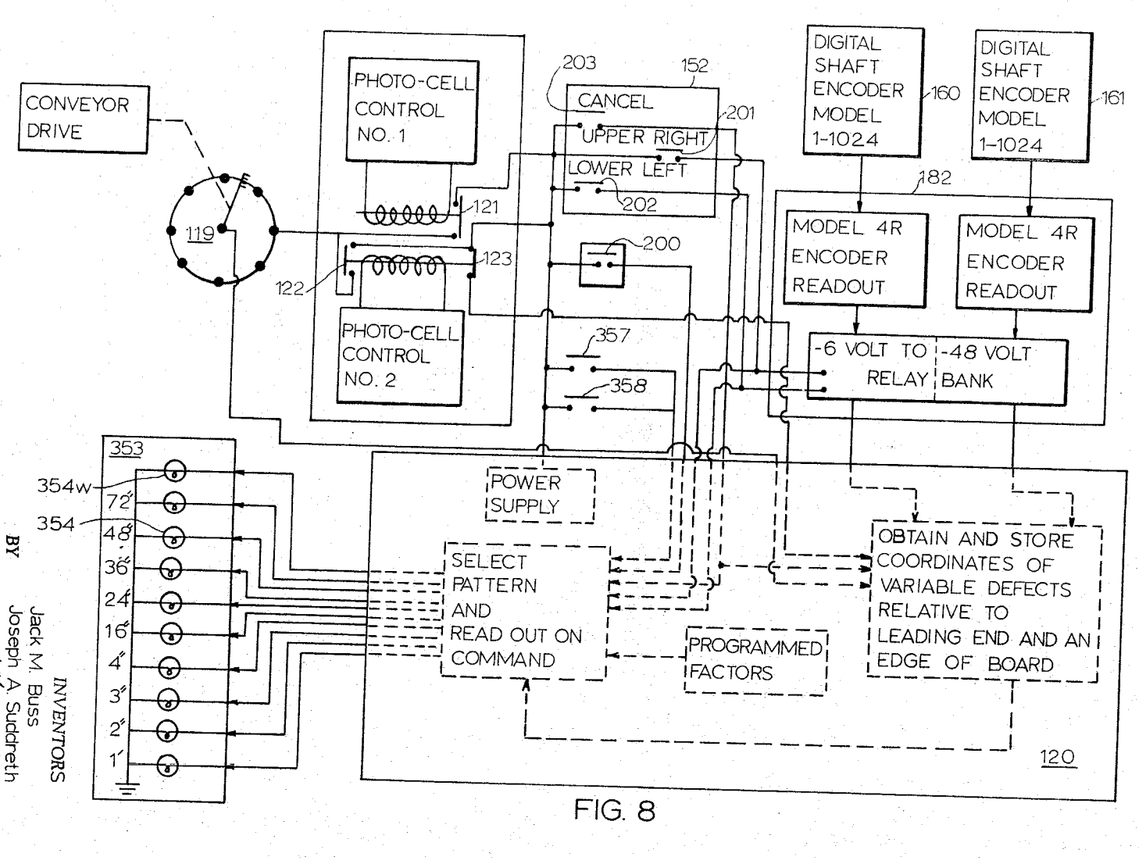
FIGURE 8 is a schematic diagram of the scanning and computing circuitry employed.

It may be noted as shown in the circuit diagram of FIGURE 8 that the computer 120 is presented with two angular disposition data inputs comprising the two outputs from the encoder readout unit 182 as long as the relay bank is being presented with a minus 48 D-C voltage whenever either push button 201 or push button 202 of scanner control 152 is closed, the push buttons being interposed in a circuit interconnecting the relay bank and a minus 48 volt D-C power supply associated with the computer 120 as shown in FIGURE 8.

The computer 120 automatically translates the said angular disposition data received into a length coordinate equivalent and a width coordinate equivalent which locate relative to the fixed point F the variable point V with which the probe 151 is in alignment when either the push button 201 marked upper right or the push button 202 marked lower left is depressed. While the computer could be suitably programmed to calculate upon said instruction for each scanner position the location coordinates of the variable point V relative to the fixed point F, the computer 120 has in practice been programmed with a table comprising a series of groups of angular disposition data corresponding to the encoder readout unit outputs when the arms 137 and 138 are in a corresponding series of positions wherein the probe 151 is in registry with a variable point, each particular group having a corresponding set of location coordinates for the variable point V when the arms 137 and 138 are so angularly disposed. The computer compares the two angular disposition inputs from the readout unit 182 with its table of angular disposition data and reads out the corresponding location coordinates of successive points V.

Figure 7:
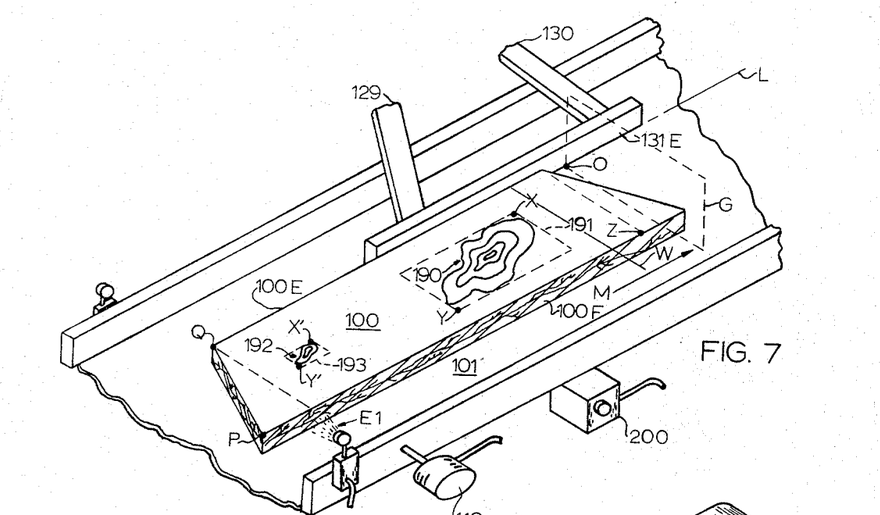
FIGURE 7 is a perspective view of a board having several defects and showing imaginary boundary lines and corners for each defect, which board is positioned on a conveyor adjacent the scanner.

In order to speed up the scanning operation whereby the randomly positioned defects in a board are located relative to the leading end and an edge of the board and in order to reduce the necessary length of the arms 137 and 138 of the scanner 90, for boards having lengths up to sixteen feet to be scanned, the board is placed upon a conveyor belt 101 which carries the board past the scanner 90. Referring to FIGURE 7, the board 100 is so positioned upon the conveyor 101 as to have and edge 100E disposed parallel to the path of movement M of the conveyor 101. An operator 110 shown in FIGURE 1 moves the scanner 90 and its reference bar 131 so as to bring the imaginary length axis L into alignment with the edge 100E of the board 100. An imaginary reference plane G extends perpendicularly from the length axis L across the conveyor 101, which plane is tangential to the furthermost extended point in the leading edge of the board 100. The intersection of the reference plane G with the length axis L is designated as the zero point 0. It is with respect to this zero point 0 in units of the rectangular coordinate system defined by the length axis L and the width axis W that the randomly positioned defects 190 and 192 in the board are to be located.

Since the zero point 0 is moved along with the board 100 by the conveyor 101 past the scanner 90, means for indicating the distance which the zero point 0 has moved relative to the fixed point F are provided. As was the case for the signals indicating the amounts or rotation of the arms 137 and 138, the distance signal must be one which may be understood by and acted upon by the computer 120 which is to select a pattern of transverse cuts for the board scanned for defect locations. A satisfactory means to the above recited ends comprises a pulse generating means which upon actuation omits a pulse of the suitable computer input voltage for each distance unit which the conveyor 101 has moved the board 100 and the zero point 0 relative to the scanner 90.

Figure 1:
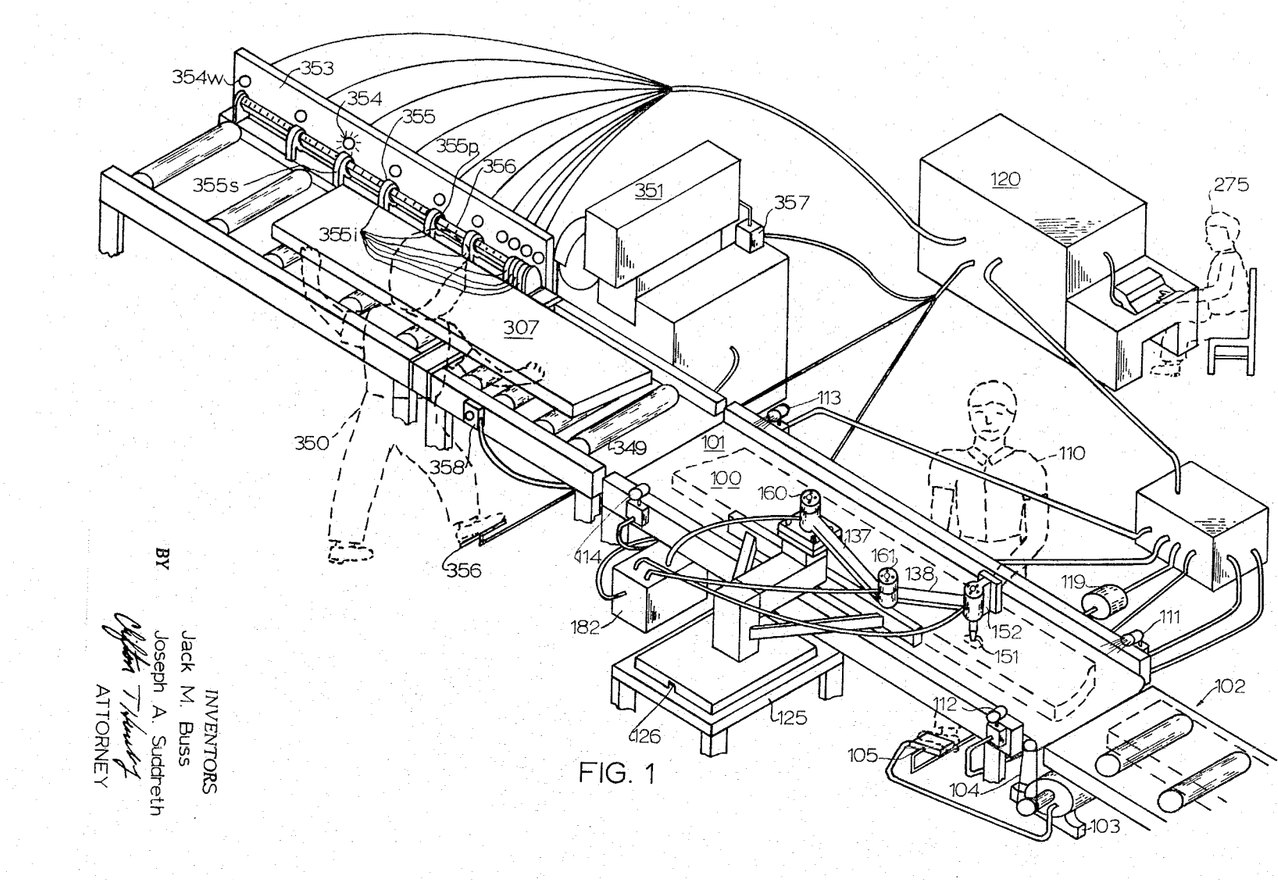
FIGURE 1 is a schematic drawing of a system employing the invention.

In actual practice, a satisfactory pulse generator 119, shown in FIGURES 1, 2, and 8, comprises an eight cylinder automobile distributor which has been so modified and so mechanically linked with the conveyor as to generate a pulse of voltage for each one-half inch of conveyor movement. As shown in the generalized schematic electrical control circuit diagram of FIGURE 8, the pulse generator 119 has an input comprising a minus 48 D-C voltage supplied by a D-C voltage supply associated with the computer 120. The output of the pulse generator 119 comprises pulses of minus 48 D-C voltage which are fed into a pulse counter associated with the computer. The actual mechanical construction of the rotopulser is not shown since automobile distributor constructions of this kind are well known. It has also been deemed unnecessary to shown or discuss the mechanical connection between the pulse generator and the conveyor, since those skilled in the art will recognize the simple type of mechanical connection required to cause the wiper arm of the pulse generator to step from one pulse point to another for each one-half inch of conveyor travel.

In order to relate the pulses received by the computer to a board being scanned, means are provided which actuate the transmission of output pulses by the pulse generator 119 thereby actuating a pulse counter associated with the computer 120 and means are provided to stop and reset the pulse counter to zero when the board has been scanned. In actual practice suitably disposed and connected photocell controls are quite satisfactory. While photocell controls having one beam of light disposed to be interrupted by a transported board could be used, it has been found preferable to use photocontrols having two properly disposed beams of light in order to speed up the scanning operation.

Referring to FIGURE 2, a first narrow beam of light $E_1$ is furnished near the side of the scanner 90 from which the conveyor 101 moves by an exciter lamp 111, which beam is directed transversely across conveyor 101 to a photocell 112. The beam $E_1$ is so disposed relative to the conveyor 101 as to be interrupted when a board 100, FIGURE 7, is carried by the conveyor 101 between the exciter 111 and the photocell 112, the pair being hereinafter called photocell control No. 1. The beam remains interrupted so long as any portion of the board is disposed between the exciter 111 and the photocell 112. In order to avoid having to complete the scanning operation of a particular board in a manner hereinafter more fully described, before the trailing end of the board is carried past photocell control No. 1, a second beam of light $E_2$ is furnished near the end of the scanner towards which the conveyor 101 moves, i.e., toward the cross-cut saw, by an exciter lamp 113, which beam is directed transversely across conveyor 101 to a photocell 114. The second beam $E_2$ is also so disposed relative to the conveyor 101 as to be interrupted when a board 100 is carried between the exciter 113 and the photocell 114, the pair being hereinafter called photocell control No. 2. The distance between the first beam of light $E_1$ and the second beam of light $E_2$ should be less than the shortest length of board to be scanned for defects. In practice, the board 100 is completely scanned between the time the leading edge of the board passes through the first beam of light $E_1$ and the time the trailing end of the board passes through the second beam of light $E_2$. The trailing end of a board scanned must be carried past the second beam of light $E_2$ prior to the insertion of the leading end of a succeeding board into the first beam of light $E_1$.

Referring to FIGURE 8, deactivation of photocell control No. 1 by the intrusion of the leading end of a board into the first beam of light $E_1$ closes normally open switch 121, which switch is interposed in a line electrically connecting the pulse generator 119 and the minus 48 D-C voltage supply associated with the computer 120. Closure of this switch thereby enables the transmission of a series of pulses of minus 48 D-C voltage to a pulse counter associated with the computer. Each time the wiper of pulse generator 119 moves to the next contact point a pulse is counted. When the trailing end of the board has passed the first beam of light $E_1$, photocell control No. 1 is activated thereby opening normally open switch 121 and disconnecting the pulse generator 119 from the voltage supplied through the switch. Deactivation of photocell control No. 2 closes normally open switch 122 whereby the pulse generator 119 is additionally electrically connected with the minus 48 D-C voltage supply associated with the computer 120, for in practice the board to be scanned is longer than the distance between beams $E_1$ and $E_2$. Activation of photocell control No. 2 opens normally open switch 122 thereby disconnecting the pulse generator 119 from the power supply and halting the series of pulses. Activation of photocell control No. 2 also closes the normally closed switch 123 whereby portions of the computer may be electrically interconnected with the minus 48 D-C voltage supply. The pulse generated by closure of switch 123 activates means within the computer whereby the pulse counter associated with the computer is reset to zero and indicates to the pattern selection program that the board has been scanned so that the pattern selected may be stored. The switches 121 and 122 are so disposed within a circuit electrically interconnecting the pulse generator 119 and, thereby, the pulse counter with the negative voltage supply that pulses are counted by the computer 120 when either photocell control No. 1 or photocell control No. 2 is deactivated, i.e., so long as a board interrupts either beam of light $E_1$, $E_2$. As can be seen, the pulse counter, therefore, actually registers for each board passing the photocell controls a number of pulses which corresponds to the length of the board plus the distance between the first beam $E_1$ and the second beam $E_2$.

Referring to FIGURE 1, a board 100 is indicated as being conveyed on a scanning station belt conveyor 101. Conveyor 101 has received the board 100 from a supply roller-conveyor system generally indicated at 102 which system in the conventional furniture operation is fed with roughly dressed boards having random lengths and randomly positioned defects therein, which boards are taken from a hack either by automatic machinery or by operators, the feeding operation not being shown in the drawings. The conveyor 101 is conventionally driven by a suitable motor 103 and drive belt 104 and is stopped and started by a suitable foot pedal control 105 actuated by the scanning station operator 110 as desired to position selected portions of successive boards within the range of the scanning apparatus 90.

Successive boards 100 are supported by the conveyor 101 with their longitudinal edges disposed parallel to the path of movement M; and after the leading end of a board 100 interrupts the beam of light $E_1$ of the photocell control No. 1, the operator 110 moves the scanner 90 so that the length axis L extending along the reference bar 131 is aligned against the proximal longitudinal edge 100E of the board 100. As the transverse leading and trailing ends of the board are not normally perpendicular to the longitudinal edges of the board, non-square ends on the boards are considered to be defects. After aligning a longitudinal edge of the board with the reference bar 131, the operator registers the probe 151 with the first variable point Z along the opposite edge 100F of the board 100 at which it is possible to make a squaring cut of the leading end of the board. The probe 151 is registered with said variable point Z by maneuvering the arms 137 and 138 so that the axis $A_3$ extends through the said point Z. The operator then depresses push button 202 delineated "Lower Left" on the control assembly 152 (FIGURE 5).

Actuation of the button 202 closes the circuit between the relay banks of the encoder readout units and the computer thereby presenting the computer 120 with angular disposition data which the computer 120 compares with its previously programmed table of angular disposition data and corresponding location coordinates. The computer 120 thereby first obtains the coordinates which are relative to the fixed point F, corresponding to the closest set of tabular angular disposition data found. The computer 120 is also simultaneously instructed by the depression of button 202 to interrupt its pattern selection operation and to read out to the coordinate obtaining stage the existing number of pulses emitted by the pulse generator 119 which the pulse counter associated with the computer has counted. At the coordinate obtaining stage, the computer 120 then adds the length coordinate first obtained to a length corresponding to the number of pulses read out and subtracts therefrom the known fixed distance from the first beam of light $E_1$ to the fixed point F at the width axis W to derive a new or revised set of coordinates for said point Z. This new set of coordinates which is relative to the zero point 0 defined by the intersection of the length axis L with the imaginary reference plane G extending perpendicularly through the extreme leading end of the board 100 is fed into the pattern selection stage where it is stored along with the indication given by the pulse sent by depressing "Lower Left" button 202 that the defect is located to the right of point Z and between point Z and the L axis. The computer then begins its programmed pattern selection operation wherein it ascertains how the board should be cut. The program selection operation of the computer 120 is more fully described after the description of the scanning operation has been fully set forth, even though the pattern selection is theoretically begun upon receipt of the first defect location information.

Having thus instructed the computer as to the point at which the squaring cut is to be made, the operator 110 then maneuvers the probe 151 into registry with a variable point X at the upper right-hand corner of an imaginary rectangle 191 visualized as enclosing a randomly positioned defect 190 (FIGURE 7). The sides of rectangle 191 are parallel to the respective axes L and W of the rectangular coordinate system thereby defined and correspond to prospective lines of cut by a cross-cut saw and/or a rip saw whereby said defect 190 could be removed. The operator 110 then depresses the push button 201 marked "Upper Right" of the scanner control 152. This presents the computer 120 with two inputs from the encoder readout units 182 through the relay bank which inputs the computer compares with the tabular inputs and thereby obtains the corresponding location coordinates relative to point F. The computer then relates these coordinates for point X to the zero point 0 as described above in connection with point Z. The coordinates of point X relative to the zero point fed into the pattern selection stage and stored along with the indication given by the pulse sent to the computer by depressing the "Upper Right" button 201 that the defect located lies to the left of the variable point X and on the other side of point X from the L axis.

Certain pieces of furniture manufactured need not be entirely made of knot-free lumber. Such furniture may be made from pieces of lumber which has "sound" knots. To the end of instructing the computer that said defect may be included in sound knot containing dimension stock and in sound knot containing core stock, a sound knot switch 200 is provided. The scanner operator 110 depresses this switch 200 when he feels that the defect being then located may be included in the inferior grade of stock. Depression of this switch interconnects the computer with its minus 48 D-C voltage supply and thereby instructs the computer to store this sound-knot indication along with the location coordinates obtained and the position of the defect relative to the point stored and the scanner reference bar 131.

The operator 110 then registers the probe 151 with a variable point Y at the lower left-hand corner of the imaginary rectangle 191 and depresses the "Lower Left" button 202 whereby the computer is actuated to store the coordinates of the location of the variable point Y relative to the zero point and to store therewith the indication as to the general location of the defect 190 relative to the variable point Y. He also depresses the switch 200 if the knot is a sound knot which will not fall out and may be included in inferior grades of stock.

The board 100 then may be carried by the conveyor 101 to a new position whereby the operator 110 may register the probe 151 with variable points X' and Y' comprising respectively the upper right-hand corner and the lower left-hand corner of an imaginary rectangle 193 visualized as enclosing a second defect 192. In like manner the other defects in the board 100 may be located relative to the leading end and the edge 100E of the board 100.

If a mistake is made as by pushing either button 201 or 202 at a time when the probe is not in registry with a selected variable point, or by pushing the wrong button 201 or 202 whereby square-off cut may be made. The push button 201 marked "Upper Right" is depressed. A lower left reading along the opposite edge of the board at the trailing end of the board at point P is also taken. Since no more defect location data is taken prior to the reactivation of photocell No. 2 by the passage of the trailing end of the board through beam $E_2$, this reading indicates to the computer the location of the trailing end of the board.

It is to be emphasized that the defect location readings may be taken in any order as the computer may be instructed to realign the readings if necessary. For example, point Q could be located first, point Y second, point X' third, etc. Some point should be located along the edge 100F of the board 100 which is opposite edge 100E in order that the computer may be instructed as to the maximum width of the board, for the computer is programmed to regard the maximum width coordinate taken during the scanning operation as indicating the width of the board. Of course, for an operation employing uniform widths of material this aspect of the program and scanning operation could be eliminated.

The board having been scanned for defects, the trailing end of the board is carried past the second beam of light $E_2$ thereby activating photocell control No. 2. This effects the opening of switch 122 whereby the emission of pulses by the roto-pulser 119 to the computer 120 is stopped, no succeeding board having meanwhile interrupted the first beam of light $E_1$. Activation of the computer has been instructed that the defect is disposed relative to the variable point located in a direction which is not in fact the case, or by pushing button 200 when the defect is not a sound knot, the push button 203 marked "Cancel" may be depressed. This instructs the computer to erase the last reading relating to defect location and defect condition which was stored after which depression a new correct reading may be taken.

At some point in time during the scanning operation the trailing end of the board will pass the first beam of light $E_1$ thereby activating photocell control No. 1 so as to open switch 121. The pulse generator 119 will, however, continue to emit pulses because the leading end of the board has previously interrupted the second beam of light $E_2$ thereby deactivating the photocell control No. 2 so as to close switch 122 and open switch 123. By spacing lights $E_1$ and $E_2$ apart a distance no less than the length of the shortest board to be utilized, the switch 122 will be closed before switch 121 is opened thereby signalling the computer that the board is still at the scanning station.

Since the trailing ends of the boards scanned are not normally square, as indicated above, defect readings must be taken so as to instruct the computer to include in its pattern selected a square-off for the trailing end of the board 100. To this end, the probe 151 is brought into registry with variable point P which comprises the last point along the edge 100E at which a photocell No. 2 also effects closure of switch 123 whereby the computer is instructed to reset the pulse counter to zero and to store the pattern selected for the board just scanned when such is obtained.

The program selection operation of the computer may be more fully, but figuratively, described in the following manner: The digital computer 120 has been previously programmed by the computer operator 275 with a series of arbitrary values which are to be assigned to pieces of dimension stock of each desired length and width having no defects, to pieces of dimension stock of each desired length and width having sound knots, to pieces of core stock of each desired length having no defects, and to pieces of core stock of each desired length having sound knots. In addition the computer operator 275 programs the computer with the desired numbers of each kind of stock to be cut. When the production requirements above noted for the pieces of a particular kind of stock have been fulfilled, or as certain quantities of pieces, e.g. 100, have been obtained, the computer 120 is programmed so as to automatically re-assign a lower value to pieces of that kind of stock, the computer having stored the numbers and sizes of each kind of stock which would be cut in accordance with the selected patterns for scanned boards. As pieces of longer length tend to be more difficult to obtain from boards having randomly positioned defects, the longer pieces tend to be assigned greater values. Dimension stock, where width is important, tends to be assigned greater values than core stock of the same length. Also, defect-free stock is assigned higher values than corresponding sizes of stock containing sound knots.

The computer 120 uses the information fed into it from the scanner in conjunction with its previously programmed requirements and, taking into consideration that each board will be ripped into required widths, selects a pattern of transverse cuts for a given board wherein the number of pieces to be prospectively obtained therefrom have the greatest total value, i.e. the maximum yield of usable lumber from that board. It may also be noted again that the computer automatically interrupts its pattern selection computation in order to compare, alter, and store the two groups of angular disposition data received from the encoder readout units 182 through the relay bank.

To determine the locations of transverse cuts for a maximum yield of usable lumber for a board, the computer, pursuant to its program, makes a series of trial fits as the defect location and condition data is received and stored wherein the computer for each reading received assigns the proper arbitrary value to each usable piece of dimension stock and core stock which would be obtained from the board if a transverse cut were made at the length coordinate of that particular reading. The computer then obtains for that trial fit the sum of the arbitrary values assigned. When a subsequent reading is received and stored, the computer revises the pattern of cuts previously indicated as having the highest sum of arbitrary values and, if possible, selects a new pattern of cuts so as to obtain a new higher sum of arbitrary values. The computer keeps track of the sum of values corresponding to each fit or potential cutting location for a particular board and selects and stores that pattern of transverse cuts which will provide pieces having the greatest sum of arbitrary values, i.e. the optimum yield. This operation involves thousands of trial fits which are performed in a sequence which will assure that the selection will be made in a minimal amount of time and will assure that the selection made is as close as possible to that which actually gives the optimum yield.

In addition to determining and storing the optimum cutting locations for the boards scanned, the computer remembers, as previously described, the number of pieces of that kind of stock to be cut pursuant to the patterns selected in order to provide an inventory check and also in order to re-adjust the arbitrary values or priorities to be assigned to the pieces which would be obtained from a trial fit or prospective cutting location so as to keep the output of the kinds of stock relatively balanced. The chosen pattern of cuts is stored in a series of equivalents of lengths of transverse cuts to be made, the first length in the series corresponding to the distance from the front end of the board at which the first cut is to be made, the second length corresponding to the distance from the first cut at which the second cut is to be made, etc. The above pattern selection operation is also interrupted by commands that the cuts in the pattern for the next board be selectively read out in sequence.

Various digital computers to serve the purpose of computer 120 are commercially available and various program writers are capable of writing the program required for utilizing the computer concept of the invention and the specific scanning data developed by the invention. As an example, there has been employed a type 1710 Control System Basic Executive Package which is a computer system developed by the International Business Machines Corporation of New York, N.Y. The functioning of this system is described in this company's manual entitled "1710 Basic Executive Program." A program suitable to the requirements of the invention was developed by the Thomas J. Watson Research Center, Yorktown Heights, N.Y. from which various well-known scientific papers on programming have heretofore been published.

The 1710 Control System comprises a type 1712 Multiplexer and terminal unit which matches the scanning inputs to the next level desired and also converts the computed signals to latching contacts under computer control; a 1711 Data Converter, model 2, which converts the 1712 signals to intelligent data form for the following 1620 Processing Unit and also performs the first step in converting the results computed by the 1620 Processing Unit to a form suitable for controlling the latching contacts; a 1620 Central Processor which calculates and makes decisions according to a stored program; and a 1621 Model 2 Paper Tape Reader Punch which is employed to enter the programs into the computer.

Once the board, as illustrated by board 307 in FIGURE 1, has been scanned by the operator 110 for defect locations and the condition of the defects, it is fed onto the saw station conveyor 349 by the action of the scanning station conveyor 101. In order to utilize the selected pattern, means must be provided to position the board 307 so that the various transverse cuts selected for the board by the computer may be made. To this end length indicating lights 354 are provided to indicate to the cross-cut saw operator 350 where the front end of the board should be positioned for the next transverse cut. The lights 354 are selectively lighted by the output program of the computer 120 in accordance with the selected cutting pattern for the board. As illustrated in FIGURE 8 each of the indicating lights 354 corresponds to a particular stop 355 to enable the making of a predetermined length of cut except for a warning light 354w later discussed.

In the conventional cross-cut operation, a rule 356 having board stops 355 positioned thereon at various desired lengths is mounted along the edge of the saw station conveyor 349 adjacent the cross-cut saw 351. Rule and stops of this kind are conventional and well known and the same is described only in general terms. The operator, having made an initial square-off cut or scrap cut from the leading end of the board and desiring to make a cut equal to the distance between the saw and stop 355s abuts the squared-off leading end of the board against the saw blade side of the selected stop 355s (FIGURE 1). The stop 355 is so constructed that its extended end 355b (FIGURE 10) is pivoted for rotation about pivot 355p. Thus, intermediate stops 355i may be pushed away by the longitudinal edge of the board (FIGURE 1) so that the squared-off leading end of the board 307 may abut the selected stop 355s substantially as shown. Having so positioned the board, the operator 350 depresses the foot pedal control 356 whereby the cross-cut saw 351 is automatically actuated to make a transverse cut and return to its rest position.

With respect to the sawing operation, it should be mentioned that furniture industries commonly employ cross-cut saws which will automatically complete one cycle by actuation of a suitable switch such as an electric or pneumatic foot pedal switch. That is, when such a control switch is depressed once and then released the saw mechanism will automatically traverse through the board, return and stop. Because such equipment is conventional it is not otherwise described in detail. The foot pedal switch 356 saw control arrangement in FIGURE 1 should be understood as simply being a generalized illustration of this kind of automatic cycling saw.

In order to practice the invention herein disclosed, an indicating light panel 353 is suitably supported behind and adjacent the stops 355. The panel carries the length indicating lights 354, which lights are each positioned above a corresponding board stop 355. Output leads extend from the output portion of the computer 120 to the indicating lights 354.

Also provided are pattern cut command switches 357 and 358. Switch 357 is a normally closed switch which is held open by the back of the cross-cut saw 351 when the saw is at rest. Switch 358 is a normally open push-button switch. As shown in FIGURE 8, both switches are interposed in parallel across a lead extending from the minus 48 volt D-C power supply associated with the computer 120 to portions of the computer which instruct the computer to interrupt the pattern selection operation and further instruct the computer to read out the length of the next cut in the sequentially stored lengths of cuts in the pattern by actuating the proper indicating light 354.

Figure 10:
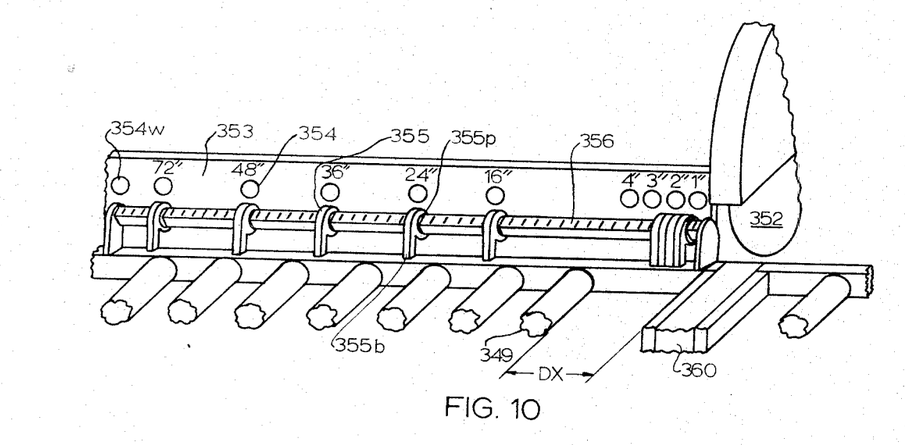
FIGURE 10 is a partial perspective of the cross-cut saw blade, the length indicating lights, and associated board stops.

Assuming that board 307 was the first board to be scanned and has been fed onto the saw station conveyor 349, the saw operator 350 pushes button 358 thereby instructing the computer 120 to interrupt its pattern selection operation being performed with respect to board 100 and to actuate the proper indicating light 354 which is positioned above the stop 355 whereby the proper length may be cut. When the saw operator has positioned the board 307 so as to abut the stop 355 over which the appropriate indicating light 354 is illuminated, he actuates a transverse cut by the cut-off saw 351 by depressing the foot pedal switch 356. As the saw moves forward to make the cut, switch 357 is allowed to close thereby instructing the computer to interrupt its program selection operation, if it is then so engaged, and actuate the proper indicating light 354 which corresponds to the length of board at which the next transverse cut in the pattern for the particular board is to be made. The operator continues to position the board in accordance with the instructions by the indicating lights and to actuate the transverse cut by the cut-off saw. It may be noted that a space, represented by the line DX in FIGURE 10 is preferably provided between the saw table 360 and the first roller 349 beyond the saw so that scrap pieces may drop through and be carried away by a suitable conveyor (not shown).

The computer automatically actuates warning light 354w when a predetermined length of board remains to be cut, such as thirty inches, or when the last length of cut exceeds the said predetermined length. This warning is helpful to the operator in the event that for some reason a particular pattern of cuts has to be abandoned, e.g., a hidden defect which the scanner operator failed to record. In this event, the saw operator 350 may cut up the board as he wishes and clear the particular pattern for that particular board from the output portion of the computer by pushing the button 358 a number of times until the warning light 354w is extinguished. The particular indicating light 354 which illuminates following extinguishing of warning light 354w corresponds to the first length of cut to be made for the next board to reach the saw operator 350.

In summary, the present invention is directed to the method disclosed and to the provision of the described scanning apparatus and to the combining of this scanning apparatus with an appropriate computer such that the cut-off saw station may be advised by control signals what lengths of cuts should be taken and the sequence of such cuts in order to obtain the optimum yield of board.

In the drawings and specification there have been set forth preferred embodiments of the invention and, although specific terms are employed, they are used in a generic and descriptive sense only and not for purposes of limitation, the scope of the invention being defined in the claims.

We claim:

1. In an electro-mechanical measuring device providing electrical data for locating a variable point relative to a fixed point in an imaginary reference line:
    (a) a first arm pivoted for rotatable movement in a fixed path about a fixed axis extending through the fixed point;
    (b) a second arm pivoted for rotation in a fixed path about an axis movable with the first arm;
    (c) a probe movable with the second arm and registrable with the variable point to be located; and
    (d) electrical means for indicating the amounts of rotation of the first and second arms about their respective axes whereby the angle of the first arm relative to the imaginary reference line and the angle of the second arm relative to the first arm may be electrically read out.

2. A device according to claim 1 which also includes electrical means for locating the variable point and the fixed point with respect to a third point in fixed relation to the variable point.

3. A device according to claim 1 wherein each of the electrical means for indicating the amounts of rotation of the first and second arms about their respective axes comprises a digital shaft encoder.

4. A device according to claim 3 in combination with a matching readout unit for each digital shaft encoder, the output of each readout unit consisting of bits of binary information.

5. In combination with a saw for cutting boards having random defects, a scanning device for determining and reading out prior to delivery of the board to the saw an equivalent of a graphic representation of a given board including the board dimensions and the location and size of any defects in that board for comparison with predetermined lumber size and quality requirements and selection of lines of cut to obtain the optimum yield of lumber, said scanning device comprising:
    (a) a first arm pivoted for rotation about an axis perpendicular to the plane of the board;
    (b) a second arm pivoted for rotation about an axis movable with the first arm and parallel to the axis of said first arm;
    (c) a probe movable with the second arm and selectively registrable with variable defect points throughout said board;
    (d) a first digital shaft encoder having a first reference line and positionable so as to measure the angular disposition of the first arm relative to the first reference line when the probe is in registry with a selected variable point;
    (e) a second digital shaft encoder having a second reference line and positionable so as to measure the angular disposition of the second arm relative to the second reference line when the probe is in registry with the said selected variable point;
    (f) an encoder readout unit operatively connected with each digital shaft encoder and arranged to read out information as to selected angular dispositions of its respective arm; and
    (g) switch control means effective to selectively actuate the said outputs of said readout units whenever the probe is in registry with the said selected variable point.

6. A structure according to claim 5 which includes:
    (a) means for moving the board in a fixed path parallel to its length past the axis of the first arm;

(b) means to measure the length of the board in equal length increments; and
(c) means to record the number of increments of the board length which have passed a point having a fixed location relative to said axis when the probe is in registry with each successive selected variable point throughout the length of the board.

7. In an apparatus for utilizing a plurality of boards having randomly located defects from which predetermined lengths are to be cut, in combination:
(a) conveyor means to successively convey to and support each such board at a first scanning station;
(b) a probe;
(c) support means adjustably supporting said probe and enabling said probe to be positioned over imaginary boundary corners of said defects;
(d) encoder means having adjustable electrical elements connected to and movable with said support means such that the electrical character thereof varies with the position of said probe;
(e) electrical pulsing means connected to said conveyor means and productive of a series of pulses corresponding in number to a certain length of travel of the leading end of said board past a fixed point;
(f) means for reading out said encoder means and converting said series of pulses to computer signals for each said probe position;
(g) a computer connected to receive said signals and programmed to determine therefrom which of said lengths should be cut from said board; and
(h) a saw control station including pattern indicating means controlled by said computer in response to the lengths so determined whereby cuts at said saw station may be taken in accordance with the activation of said pattern indicating means.

8. Apparatus according to claim 7 which includes board sensing means operatively connected to said electrical pulsing means, said board sensing means being responsive to the presence of successive boards on said conveyor at the scanning station to normally permit reception of the series of pulses by said computer.

9. Apparatus according to claim 7 which includes:
(a) a normally closed switch so operatively connected to said pulsing means as to normally permit reception of the series of pulses by said computer;
(b) a photocell control comprising in combination:
(i) a source of light arranged to direct a beam of light transversely across the conveyor at said scanning station in the path of successive boards, and
(ii) a photocell arranged to receive the said beam of light from said source in the absence of an intervening board at the scanning station, said photocell being responsive to said beam of light from said source to actuate opening of said normally closed switch.

10. Apparatus according to claim 9 which additionally includes:
(a) a second normally closed switch so operatively connected to said pulsing means as to independently of the first said normally closed switch normally permit reception of the series of pulses by said computer and,
(b) a second photocell control including:
(i) a second source of light arranged to direct a second beam of light transversely across the conveyor at said scanning station in the path of successive boards, which second beam is spaced in the direction of movement of the conveyor from that beam of light directed from the first said source of light and
(ii) a second photocell arranged to receive said second beam of light from said second source of light in the absence of an intervening board, said photocell being responsive to reception of said second beam of light from said second source to actuate opening of said second normally closed switch.

11. In an apparatus for cutting a plurality of different predetermined lengths from each of successive boards at least some of which have randomly located defects and each of which boards has a leading edge, a trailing edge, and longitudinal edges, said apparatus having a cross-cut saw station provided with;
(i) a saw blade selectively movable transversely into and out of the path of successive boards to cut them into said predetermined lengths,
(ii) reference means adjacent the saw blade with which to align one longitudinal edge of the board in perpendicular relation to the path of the saw blade, and
(iii) a series of stops spaced from one side of the saw blade and from each other in a direction parallel to the said one longitudinal edge of the board, the distance between the saw blade and successively remote stops corresponding to the said plurality of different predetermined lengths to be cut;

the combination of:
(a) a scanning station in advance of the saw station and spaced from the side of the saw blade opposite the series of stops, said scanning station including:
(i) a probe,
(ii) support means adjustably supporting said probe for movement into position adjacent the edges of defects,
(iii) encoder means including adjustable electrical elements connected to and movable with said support means productive of a signal which varies with the position of said probe,
(iv) readout means operably connected to said encoder means to translate said signal from the encoder means into a form understandable by a computer, and
(v) first switch means associated with the probe and selectively operable to actuate transmission of the translated encoder signal when the probe is located in a desired position adjacent the edge of a selected defect;
(b) a computer operatively connected to said readout means to receive said translated encoder signals upon actuation of said first switch means, said computer being suitably programmed to select a pattern of cuts for successive boards as influenced by said translated encoder signals;
(c) indicating means to indicate the pattern of cuts at said cross-cut saw station actuated by said computer; and
(d) second switch means connected to the said computer for instructing the computer to actuate said indicating means.

12. Apparatus according to claim 11 wherein the indicating means comprise a set of lamps, each lamp positioned adjacent a respective stop and independently illuminated in response to computer actuation.

13. Apparatus according to claim 12 wherein the second switch means comprises a normally open switch positioned so as to be closed in response to movement of the said saw blade toward the path of successive boards.

14. Apparatus according to claim 13 which includes third switch means operatively connected to the said computer for instructing said computer independently of said second switch means to actuate said indicating means.

15. Apparatus according to claim 14 which additionally includes additional switching means at said scanning station operatively connected to said computer for selectively instructing said computer as to the quality of certain defects.

16. A method of utilizing in combination with a suitably programmed computer a scanning device having first and second articulated arms, a probe mounted on one of the arms, a reference point in an imaginary reference line, and a fixed point located in fixed relation to the reference point to locate a variable point in an object relative to a zero point movable with said object comprising the steps of:
- (a) moving the said object and the said zero point past the fixed point;
- (b) effecting movement of the arms of the scanning device to register the probe with said variable point;
- (c) measuring the distance which the zero point has been moved past the fixed point when the probe is in registry with the variable point;
- (d) translating said distance measurement into bits of binary information;
- (e) measuring the amount of rotation of the first arm relative to the imaginary reference line and the amount of rotation of the second arm relative to the first arm when the probe is in registry with the variable point;
- (f) translating said rotation measurements into bits of binary information; and
- (g) feeding said bits of information into said suitably programmed computer whereby the computer may ascertain the location of the variable point relative to said zero point.

17. A method of utilizing in combination with a suitably programmed computer a scanning device having first and second articulated arms, a probe mounted on one of the arms, a reference point in an imaginary line, and a fixed point located in fixed relation to said reference point to successively locate in an object relative to a zero point movable with said object randomly positioned defects each having a first and a second variable point located at opposite sides of said defect comprising the steps of:
- (a) moving the said object and the said zero point past the fixed point;
- (b) effecting movement of the arms of the scanning device to register the probe with a first variable point located at one side of a selected defect;
- (c) measuring the distance which the zero point has been moved past the fixed point when the probe is in registry with the variable point;
- (d) translating said distance measurement into bits of binary information;
- (e) measuring the amount of rotation of the first arm relative to the imaginary reference line and the amount of rotation of the second arm relative to the first arm when the probe is in registry with the said variable point at one side of the selected defect;
- (f) translating said rotation measurements into bits of binary information;
- (g) feeding said bits of information into said suitably programmed computer;
- (h) indicating to the computer the general location of the said selected defect relative to said first variable point;
- (i) effecting movement of the arms of the scanning device to register the probe with a second variable point located at the opposite side of said selected defect from said first variable point;
- (j) measuring the distance which the zero point has been moved past the fixed point when the probe is in registry with the second variable point;
- (k) translating said distance measurement into bits of binary information;
- (l) measuring the amount of rotation of the first arm relative to the imaginary reference line and the amount of rotation of the second arm relative to the first arm when the probe is in registry with the second variable point at the opposite side of the selected defect from said first variable point;
- (m) translating said rotation measurements into bits of binary information;
- (n) feeding said bits of information into said suitably programmed computer; and
- (o) indicating to the computer the general location of the said selected defect relative to said second variable point whereby the computer may ascertain the size of said defect and the location of said defect relative to said zero point.

18. A method of utilizing successive boards having randomly located defects including the steps of:
- (a) designating the required sizes and quality of dimension stock and core stock;
- (b) sensing successive boards for information as to their respective sizes and for information as to the size and location of any defects therein;
- (c) successively determining from said information for each board and from said designated requirements various patterns of cutting to obtain at least some of said required pieces of stock;
- (d) selecting that pattern of cutting each successive board to obtain the optimum yield of required stock; and
- (e) cutting each successive board in accordance with the said selected pattern of cutting.

19. A method of utilizing successive boards having randomly located undesirable defects and randomly located permissible defects including the steps of:
- (a) designating the required sizes of;
  - (i) first kinds of stock which are free both of said undesirable defects and of said permissible defects and
  - (ii) second kinds of stock which are free of said undesirable defects;
- (b) sensing successive boards for information as to their respective sizes and for information as to the size, the type, and the location of any defects therein;
- (c) successively determining from said information for each board and from said designated requirements various patterns of cutting to obtain at least some of said required pieces of stock;
- (d) selecting that pattern of cutting each successive board to obtain the optimum yield of required stock; and
- (e) cutting each successive board in accordance with the said selected pattern of cutting.

20. A method according to claim 18 wherein the step of sensing successive boards for information includes the steps of:
- (a) positioning successive boards at a scanning station having a reference point;
- (b) moving a probe of a scanning device into registry with selected variable points associated with each of said defects in successive boards; and
- (c) signalling the position of the probe relative to the reference point at each said point of registry.

21. The method according to claim 18 wherein said successive boards include boards having variable dimensions.

22. The method according to claim 18 wherein the step of sensing successive boards for information includes:
- (a) positioning successive boards at a sensing station having a reference point;
- (b) sensing the size of successive boards and the location of selected variable points associated with each of said defects in successive boards; and
- (c) signalling the position of said variable points relative to the reference point.

23. The method according to claim 22 wherein the step of signalling the position of said variable points includes relaying the coordinants of said variable points relative to said reference point to a computer.

24. The method according to claim 22 wherein said step of sensing the size of successive boards includes:
- (a) positioning one side of a board on a longitudinal reference line;
- (b) measuring the distance of the other side of said board from said longitudinal reference line; and (c) moving said board past a fixed transverse reference line to measure the length of said board.

25. A method according to claim 20 wherein the step of moving a probe of a scanning device into registry with selected variable points comprises maneuvering the probe into registry with points at opposite corners of an imaginary rectangle whose sides enclose a randomly positioned defect.

References Cited

UNITED STATES PATENTS

| | | | |
|---|---|---|---|
| 3,191,857 | 6/1965 | Galey et al. | 83—371 XR |
| 3,246,550 | 4/1966 | Galey et al. | 83—371 XR |

WILLIAM W. DYER, Jr., *Primary Examiner.*

W. D. BRAY, *Assistant Examiner.*